UNITED STATES PATENT OFFICE.

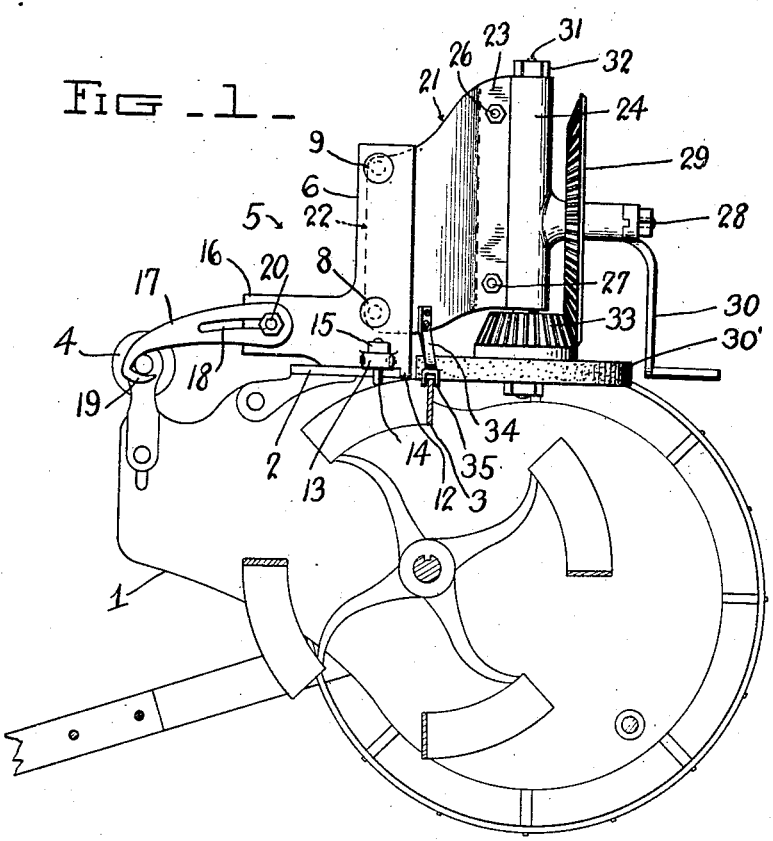
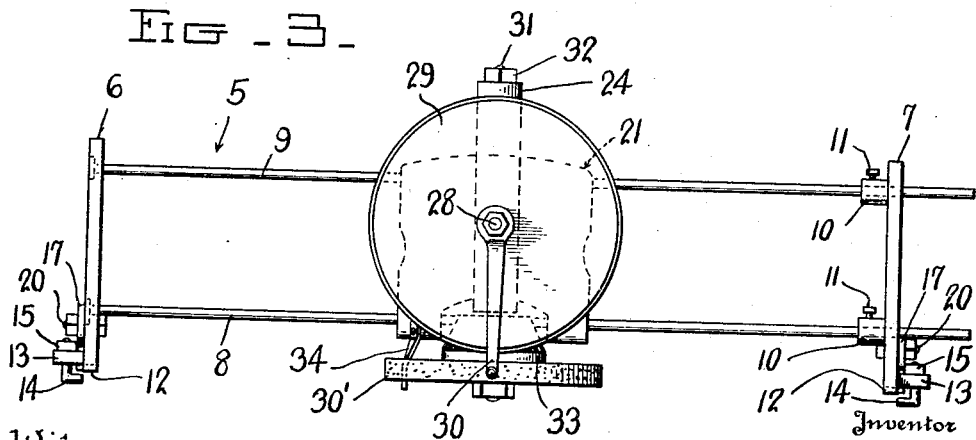

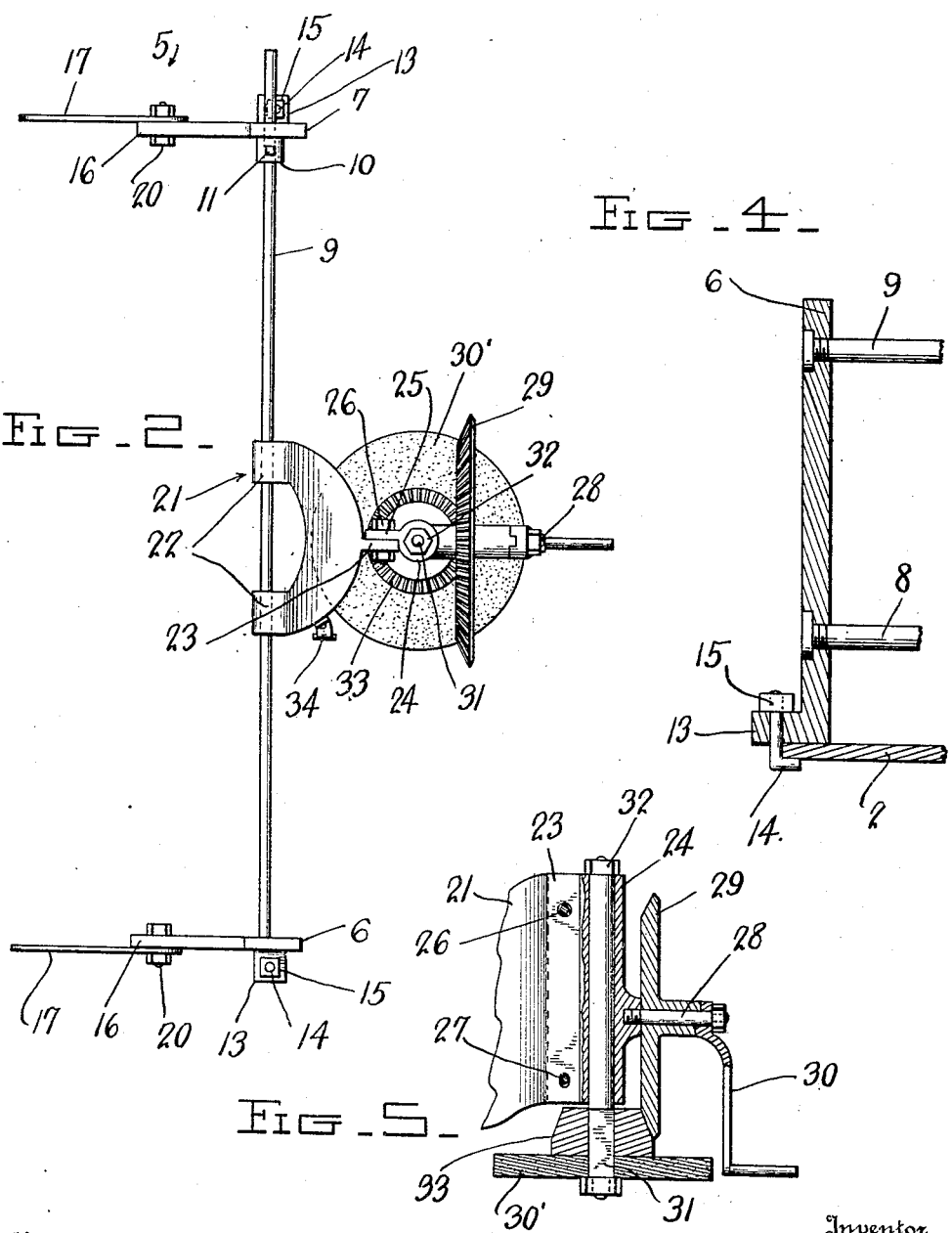

CHRISTIAN F. RUMOLD, OF BEREA, KENTUCKY.

LAWN-MOWER SHARPENER.

1,287,445. Specification of Letters Patent. Patented Dec. 10, 1918.

Application filed February 16, 1918. Serial No. 217,666.

*To all whom it may concern:*

Be it known that I, CHRISTIAN F. RUMOLD, a citizen of the United States, residing at Berea, in the county of Madison and State of Kentucky, have invented new and useful Improvements in Lawn-Mower Sharpeners, of which the following is a specification.

This invention relates to an improved lawn mower sharpener adapted to be attached to a lawn mower, when the latter is in inverted position, and to be used for sharpening the curved blade of the revoluble reel, the object of the invention being to provide an improved machine of this character which is simple in construction, is strong and durable and which can be readily attached to or removed from a lawn mower, which can be adjusted according to the size of the lawn mower on which it is to be used, and which can be readily operated manually.

With the above and other objects in view the invention consists in the construction, combination and arrangement of devices hereinafter described and claimed.

In the accompanying drawing:

Figure 1 is a side elevation of a lawn mower sharpener constructed and arranged in accordance with my invention, showing the same in place on a lawn mower, a portion of the frame of the lawn mower, its ledger bar, cutting blades and roller being indicated in outlines.

Fig. 2 is a plan of my improved lawn mower sharpener.

Fig. 3 is a front elevation of the same.

Fig. 4 is a detail sectional view of one of the frame standards and associated parts, and showing said standards secured to one end of a lawn mower ledger bar.

Fig. 5 is a detail sectional view through the center of the carriage and the rods of the frame.

For the purposes of this specification a portion of a lawn mower frame in inverted position is indicated at 1, the ledger bar being indicated at 2, the reel with its cutting blade at 3, and the usual roller being indicated at 4.

In the embodiment of my invention, I provide a frame 5 which comprises a pair of standards 6 and 7, and a pair of rods by means of which the standards are adjustably connected together, said rods being indicated at 8 and 9 respectively. The rods are rigidly secured at one end to the standards 6 and pass through openings with which the standard 7 is provided, the said standard being also formed with tubular lugs 10 on its inner side, through which the rods 8 and 9 slidably pass, the said tubular lugs being provided with set screws 11 by means of which the standard 7 may be secured on the rods 8 and 9 at any desired distance from the standards 6, according to the width of the lawn mower on which the machine is secured and the corresponding length of the ledger bar. The standards are arranged to bear and be secured on the end portion of the ledger bar, as indicated in Fig. 1 and are provided with downwardly extending lugs 12 which bear against the front edge of the ledger bar. The standards are also formed at their lower ends on their outer sides, with ears 13, each of which has a vertical opening. L-bolts 14 are arranged in said openings and engage under the end of the ledger bar, each L-bolt having a nut 15 screwed on the upper portion thereof to bear on one of the ears 13 and thereby firmly clamp the L-bolt to the end of the ledger bar and hence cause the L-bolt to securely and yet detachably fasten the standards on the ledger bar. Each standard has a rearwardly extending arm 16.

Associated with each arm 16 is a hook arm 17. Said hook arms are flexible and are each provided with a slot 18. Each hook arm has a bill 19 to engage one end of the spindle of the roller 4 and each hook arm is secured detachably and adjustably to one of the arms 16 by means of a clamping bolt 20, said bolts 20 operating in the slots 18 to enable the hook arms to be adjusted longitudinally with respect to the arm 16 so that the frame 5 may be secured on lawn mowers of various sizes and said hook arms may be tightened as required to hold the frame 5 securely in place.

A carriage 21, which may be of the form here-shown, or of any suitable form, is provided on its rear side with vertical arms 22 which have horizontal openings through which the rods 8, 9, extend. Hence the carriage is mounted on said rods and is arranged for longitudinal movement and may be readily moved from end to end of the frame 5 as required when sharpening a lawn mower blade. On the front side of the carriage is a forwardly extending vertical flange 23. A tubular bearing 24 is provided with a rearwardly extending flange 25 which bears against one side of the flange 23 and is detachably and adjustably secured thereto by means of an upper bolt 26 and a lower bolt 27. The bolt holes in the flange 23 are slightly elongated in a vertical direction and the upper bolt hole is also somewhat larger than the bolts 26. Hence a tubular bearing may be adjusted slightly in a vertical direction and may also be slightly tilted as may be required in grinding the blade of the lawn mower. A stub shaft 28 is secured to the tubular bearing and projects forwardly therefrom and on said stub shaft is mounted a beveled gear wheel 29 which is provided with a crank handle 30 whereby said gear wheel may be readily manually rotated.

A grinding element 30', which in practice may be of sand stone, emery or any other suitable material is provided with a shaft 31 which is mounted in the tubular bearings 24. Said shaft is slightly vertically adjustable in the tubular bearings and is provided with an adjusting and securing nut 32 which bears on the upper end of the bearing as shown. Also secured to the end shaft is a beveled gear 33 which is engaged by the driving gear 29. The depth of the teeth of the gear 29—33 is such as to enable the shaft with its grinding element to be slightly vertically adjusted as may be required. The carriage is provided with a guide 34 which extends downwardly therefrom and is slotted at its lower end as at 35 to engage any one of the blades of the lawn mower. When the sharpener has been thus secured and arranged on a lawn mower, with its guide engaging one of the cutting blades of the lawn mower and with the grinding elements bearing on the edge of the said blades as indicated in Fig. 1, the crank 30 is then turned manually thereby causing the gears 29—33 to rotate the grinding elements so that the grinding elements sharpen the blade, as will be understood. From time to time the carriage is moved endwise so that the blade is sharpened throughout its entire length and to exactly the same degree. The lawn mower blades are thus sharpened one at a time.

While I have herein shown and described a preferred form of my invention, I would have it understood that changes may be made in the form, proportion and the construction of the several parts without departing from the spirit of my invention and within the scope of the appended claim.

Having described the invention what is claimed is:—

A lawn mower sharpener comprising a frame embodying standards to bear on the ledger bar of a lawn mower and means to secure said standards to said bar, and also embodying rods connecting said standards, a carriage mounted on the rods of said frame for longitudinal movement and having a guide to engage a lawn mower blade, a revoluble grinding element mounted in the carriage, means to operate said grinding element, and hook arms secured directly to the standards of the frame and arranged to engage the standards of the lawn mower roller.

In testimony whereof I affix my signature.

CHRISTIAN F. RUMOLD.

Copies of this patent may be obtained for five cents each, by addressing the "Commissioner of Patents, Washington, D. C."